Sept. 12, 1967 L. NAMENYI-KATZ 3,341,142
SOUND REPRODUCING APPARATUS
Filed June 1, 1965 4 Sheets-Sheet 1

Laszlo Namenyi - Katz
INVENTOR

BY

Lawrence E. Laubscher
ATTORNEY

Sept. 12, 1967 L. NAMENYI-KATZ 3,341,142

SOUND REPRODUCING APPARATUS

Filed June 1, 1965 4 Sheets-Sheet 2

Laszlo Namenyi-Katz

INVENTOR

BY

Lawrence E. Laubscher

ATTORNEY

Laszlo Namenyi-Katz
INVENTOR

BY

Lawrence E. Laubscher
ATTORNEY

Sept. 12, 1967 L. NAMENYI-KATZ 3,341,142

SOUND REPRODUCING APPARATUS

Filed June 1, 1965 4 Sheets-Sheet 4

Laszlo Namenyi-Katz
INVENTOR

BY

Lawrence E. Laubscher
ATTORNEY

United States Patent Office 3,341,142
Patented Sept. 12, 1967

3,341,142
SOUND REPRODUCING APPARATUS
Laszlo Namenyi-Katz, London, England, assignor to Clarke & Smith Manufacturing Company Limited
Filed June 1, 1965, Ser. No. 460,393
Claims priority, application Great Britain, May 29, 1964, 22,430/64
18 Claims. (Cl. 242—55.13)

This invention relates to apparatus for reproducing sound rceorded on a magnetic tape.

It is a general object of this invention to provide that the apparatus can be readily loaded or unloaded.

It is a related object of one aspect of the invention to provide an improved tape magazine or cassette for use in the reproducing apparatus.

It is an object of one aspect of the invention to provide that the tape magazine can be reversed by overturning it. This may be particularly advantageous if it is desired to avoid the necessity for rewinding the tape.

It is a more particular object of one aspect of the invention to make simple and effective provision for withdrawing a capstan idler roller from the capstan in such apparatus, so that, for instance, the formation of flat regions on the surface of the idler roller may be avoided. Such flat regions may be incurred if the apparatus is left idle for appreciable periods with the idler roller urged against the capstan.

It is a broad object of yet another aspect of the invention to provide a convenient and relatively simple sound reproducing apparatus, which nonetheless has desirable operational features.

The invention provides a magnetic tape magazine for use on the tape deck of magnetic tape sound reproducing apparatus having a capstan for driving the tape along a path over a pick-up head, an actuator member disposed beside said capstan, said magazine comprising a body member presenting fiduciary surfaces for locating the magazine on the tape deck and bearing a pair of tape spools and guide means for guiding the tape between the spools, said guide means including a capstan idler roller for cooperating in a tape drive position with said capstan and withdrawable against spring bias on actuation of said actuator member to a tape disengaged position, said guide means and tape spools being symmetrically arranged with respect to said fiduciary surfaces whereby the magazine can be overturned on the tape deck thereby to reverse the tape drive.

The invention further provides apparatus for reproducing sound recorded on magnetic tape and comprising a tape deck; a capstan mounted on the tape deck for driving the tape; a pick-up transducer responsive to magnetic signals on the tape and mounted on the tape deck; a removable tape magazine comprising a body member having fiduciary surfaces locating the magazine on the tape deck, a pair of tape spools rotatably mounted on said body member and guide means for presenting a length of the tape extending between the spools to the capstan and the pick-up transducer, said guide means being mounted from said body member and including a capstan idler roller for cooperating resiliently in a tape drive position with the capstan whereby to urge the tape against the capstan and hence to provide the tape drive; and an actuator member mounted on the tape deck for withdrawing said idler roller to a tape disengaged position in which pressure of the capstan on the idler roller is released.

Whilst of wider application, an apparatus in accordance with the invention may be particularly designed and suited for use by visitors to places of interest or instruction, such as museums or places of historic interest, to give the visitor information of interest.

Other features and advantages of the invention will appear from the following description of one embodiment thereof, given by way of example, in conjunction with the accompanying drawings, in which.

Figure 1:
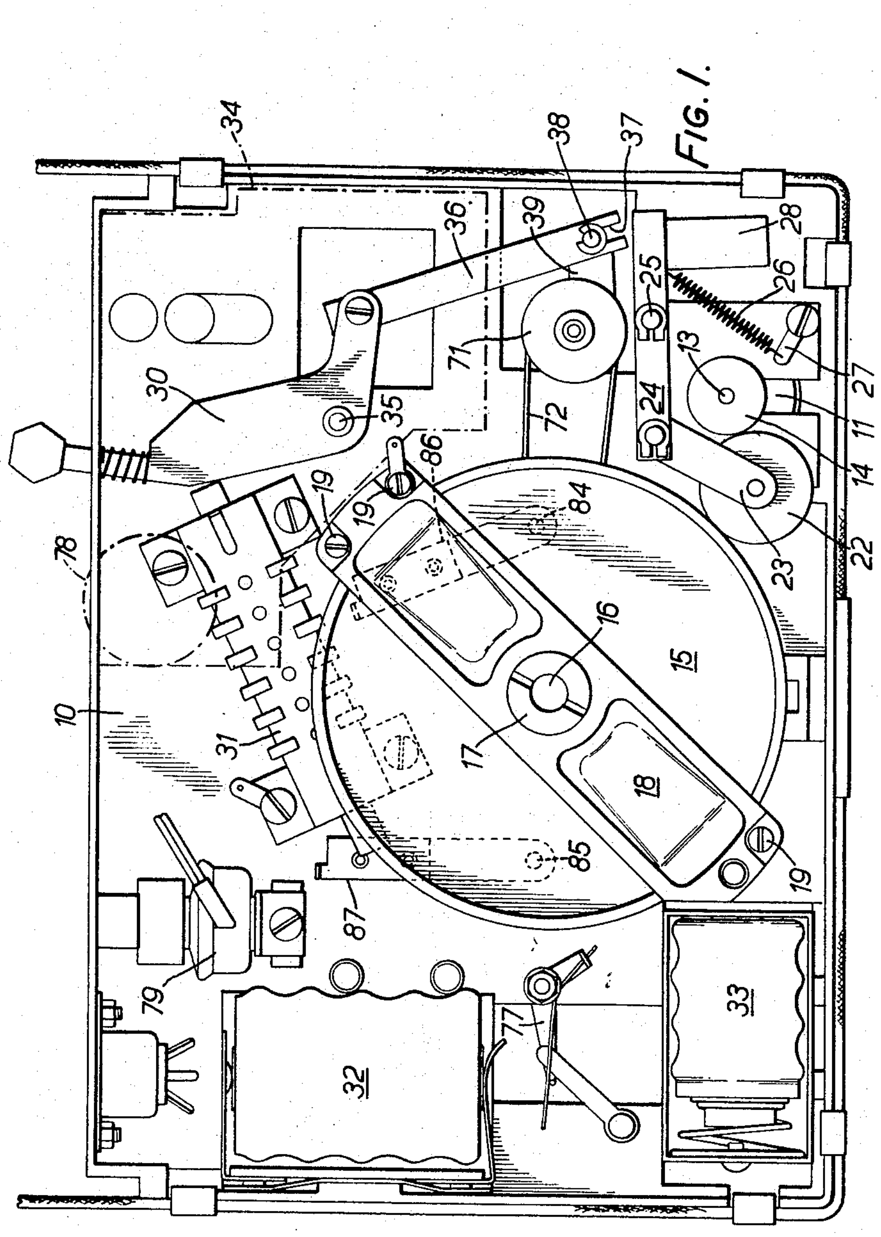
FIGURE 1 is a view from one side of an apparatus, with the side cover removed.
Figure 2:
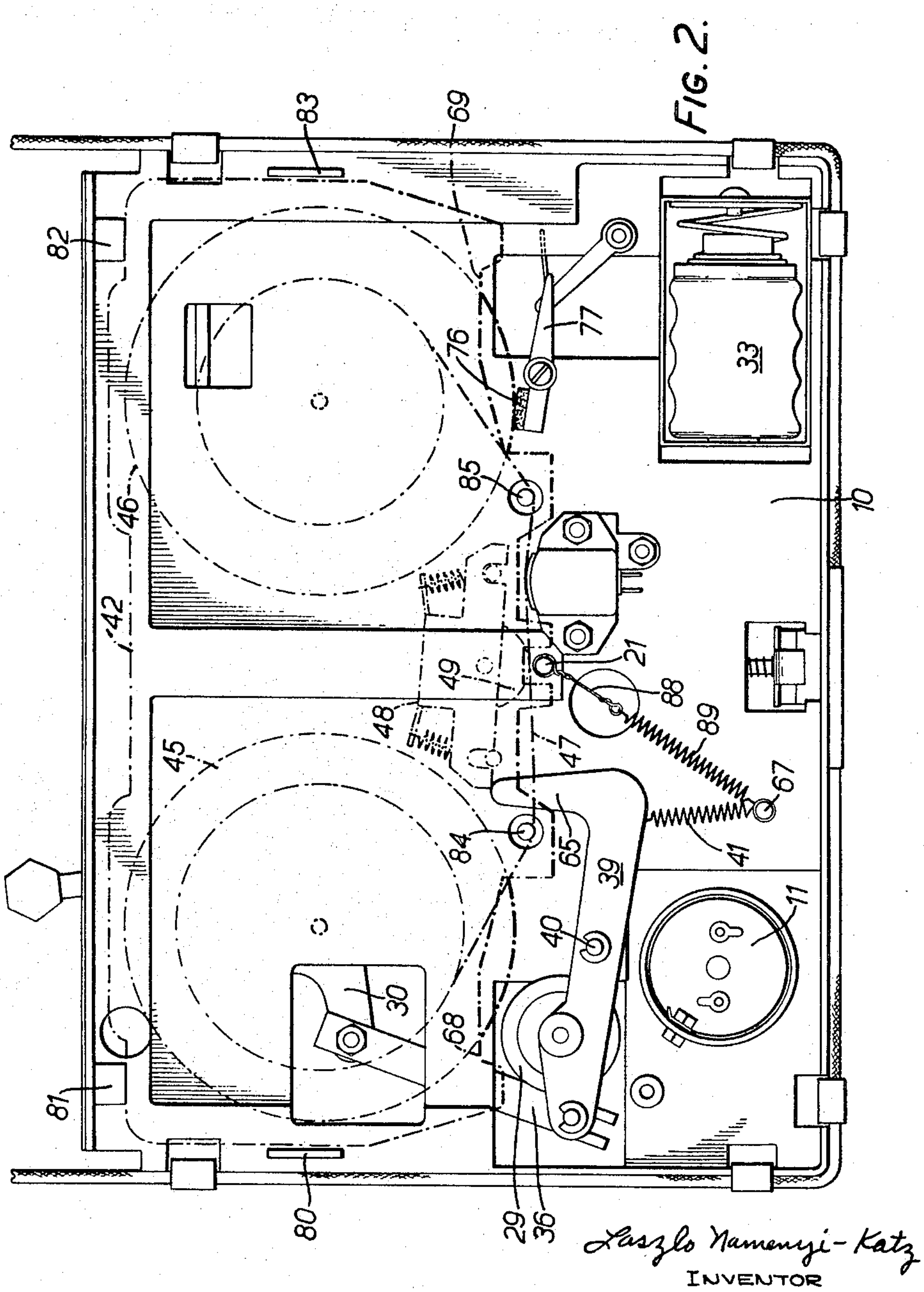
FIGURE 2 is a view from the opposite side of the apparatus of FIGURE 1, also with the cover removed.
Figure 3:
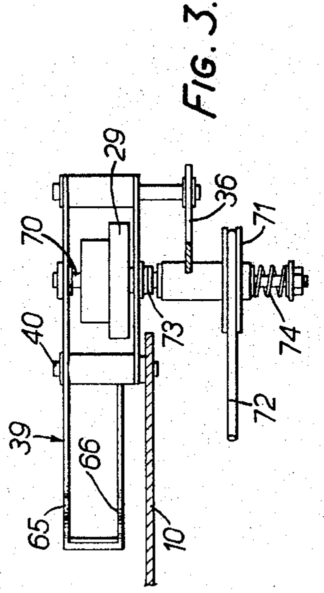
FIGURE 3 is a detail sectional view of the apparatus.

FIGURES 1 to 3 show a tape deck intended to receive a cassette containing supply and take-up reels for a standard width magnetic tape. The cassette can be inserted in the apparatus and when so inserted is in correct position in relation to driving and reproducing means on the apparatus, for the tape to be advanced from the one spool to the other, past a reproducing head. A switch on the apparatus enables the tape to be fed and reproduced in this way, as desired. The sound output can be heard by the user by means of an ordinary insert type earpiece, which conveniently is coupled by an acoustic tube to a transducer on the apparatus.

The apparatus comprises a main tray-like body 10, which in the normal position of use would be vertical. Components are mounted on both sides of the body. On one side is mounted the tape driving means and the electrical amplifying circuits. The driving means includes a small electric motor 11, mounted in an opening in the body, and carrying on its spindle 13 a drive pulley 14. The pulley 14 is used to drive a flywheel 15; flywheel 15 is mounted on shaft 16, one end of which is carried in a bearing, not shown, in the body, whilst the other end is supported in a bearing 17 carried in a bridge 18, supported at its ends with respect to the body, by screws 19. A reduced portion 21 of shaft 16 projects from the other face of the body, and provides a tape drive capstan. Pulley 14 drives the periphery of flywheel 15 by means of a jockey friction pulley 22, carried by a link 23, from an arm 24 pivoted at 25, the arm 24 being spring-loaded to bring the jockey pulley 22 into engagement with pulley 14 and flywheel 15, by means of a spring 26 anchored at one end to the arm and at the other end to an adjustable lug 27.

The arm 24 is also provided with a counterweight 28 so that the force with which the pulley 22 is urged against the drive pulley 14 and the flywheel 15 is substantially independent of the orientation of the apparatus.

The flywheel is coupled by a belt drive to a spool drive wheel 29 which is movable under the control of a cranked control lever 30 to engage the take-up spool of the cassette. The control lever 30 also controls a spring loaded switch arrangement 31 which switches the electric supply from rechargeable sources 32 and 33 to the drive motor 11 and amplifier circuits indicated at 34.

The control lever 30 pivots at 35 to move a link 36, which is attached at one end to the lever 30 and has a slot 37 at the other end engaging a pin 38 of a doubled lever 39 carrying between its legs the spool drive pulley 29. The lever 39 is pivoted at 40 and biased by a spring 41 to rotate clockwise (as seen in FIGURE 2) when the control lever 30 is rotated anti-clockwise (as seen in FIGURE 1) it actuates the switch 31, and moves the link 36 upwards, allowing the lever 39 to rotate, thus moving the spool drive wheel 29 upwards.

Figure 5:
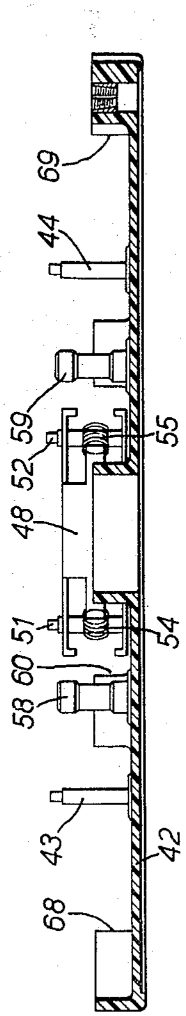
FIGURE 5 is a sectional view of the cassette taken on the line V—V in FIGURE 4.
Figure 4:
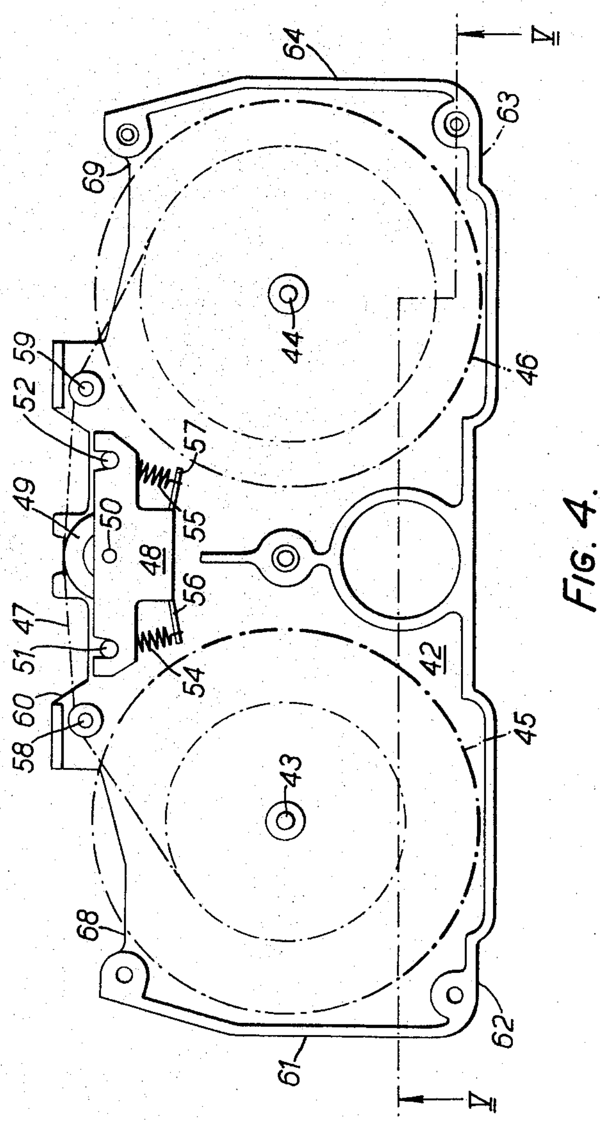
FIGURE 4 is a plan view of a tape cassette, with one part of the cassette casing removed.

A cassette, as shown in FIGURES 4 and 5, comprises a 2-part casing, of which one part is shown at 42. The two parts of the casing can be substantially identical in shape. Within part 42 are spindles 43 and 44, to receive two tape spools, the positions of which are indicated at 45 and 46. These spools carry a magnetic tape indicated at 47, conveniently of conventional quarter-inch width. Also mounted within the cassette is a pressure roller assembly. This includes a yoke 48, within the two side faces of which is mounted a pressure roller 49 having a resilient surface portion and carried on a spindle 50, passing between the sides of the yoke. The yoke is mounted so as to float; two pins 51 and 52 are fastened in the one part of the cassette, and the yoke has slots in its opposite faces which engage the pins. The yoke is held on these pins by means of springs 54 and 55 which are attached at one end to a projection 56, 57 formed integrally with the yoke, and at their other ends pass round the pins 51, 52. In this way, the pressure roller is biased in the upward direction as seen in FIGURE 4 against the pins 51 and 52, but can yield under the tension of springs 54, 55. Guide posts 58, 59 are provided each side of the pressure roller assembly. The path of the tape, as indicated, is from one to the other of the two spools, over the guide posts 58, 59 and the surface of roller 49. The cassette has a cut-out portion at 60, between the guide posts 58, 59. Location surfaces are provided at 61, 62, 63 and 64 on the casing as at 42.

When the cassette is inserted in the apparatus, the lever 39 is arranged so that the pressure roller 49 is held away from the capstan 21, disengaging tape drive, and the drive wheel 29 is held off the take-up spool. Referring particularly to FIGURES 2 and 3, the end of the lever 39 has at its end remote from the drive wheel 29 two upwardly extending fingers 65, 66. The lever is biased with the fingers 65, 66 tending to move downwardly by the spring 41 which is anchored at 67. The spool drive wheel 29 is intended to engage the periphery of the take-up spool, such as 45, of an inserted cassette, the casing of the cassette having an opening as at 68 and 69 so that the drive wheel 29 may penetrate it a sufficient depth for this purpose. The wheel 29 is rotated about an axle 70 through a friction arrangement, shown more particularly in FIGURE 3. The axle 70 carries on it a belt pulley 71, driven by a belt 72 passing round the pulley and round a pulley groove (not seen) on flywheel 15. A friction coupling is provided by friction washers 73, spring loaded on axle 70 by meons of a compression spring 74. With the cassette inserted, and the control lever in its "off" position, as shown in FIGURES 1 and 2, the fingers 65, 66 extend through opening 60 in the cassette casing to engage one end of the pressure roller yoke 48, lifting this end off its stop post (51 or 52), and holding the capstan idler roller 49 withdrawn away from the capstan 21 in a direction transverse to the tape path.

When the control lever is moved to its "on" position, link 36 is raised, and spring 41 causes the lever 39 to rotate. Consequently, the fingers 65, 66 are slightly withdrawn, allowing the idler roller 49 to advance to a tape drive position in which the tape 55 is positively engaged between the pressure roller 49 and capstan 21. This pivotal movement of lever 39 also causes the spool drive wheel 29 to bear against the periphery of the spool 45, thereby taking up tape driven past the capstan. The roller 49 and capstan 21 will tend to overdrive the spool, thus allowing for varying diameter of tape on the take-up spool. The tape is advanced past the reproducing magnetic head 75, which is enabled to engage the tape within the cassette, by means of the cut away portion 60, mentioned above. Also, means are provided to check the free unwinding of the supply spool, such as 46, consisting of a pressure pad 76, carried on a small spring loaded arm 77 mounted on the body 10, and projecting through opening 69 in the cassette, and into engagement with the periphery of the spool 46.

The head output is amplified by a suitable circuit, comprising a printed circuit board assembly indicated at 34 bearing the necessary components. The level of reproduction can be controlled by a variable potentiometer 78, and the earpiece is a small transducer capsule 79, having an acoustic tube (not shown) pushed in and feeding an ear insert piece (also not shown).

The cassette is held on the body between the surface of the body and a casing member, not shown, the cassette being located by the fiduciary surfaces 61, 62, 63, 64, which bear against corresponding lugs 80, 81, 82, 83 on the body 10. The cassettes are reversible, and when the tape has been completely played back, it is sufficient merely to remove the cassette, reverse it end-to-end and reinsert in the apparatus. So that it can be reversed in this way the cassette is substantially symmetrical; the pressure roller 49 is centrally disposed, and the yoke 48 in which it is mounted extends similarly each side of it, floating on the pins 51 and 52, tensioned by springs 54 and 55, so as to accommodate any slight differences from one cassette, or recorder, to the next. It is also advantageous with the construction of cassette shown, that it is robust, free of any projecting parts liable to damage and that the tape is well protected with only a very short portion exposed through the cassette openings.

For the service mentioned above it is convenient if a two-track tape record is used, with the same information recorded from each end; this obviates rewinding the tape after playing each track. If desired, an indication can be given that the end of the track has been reached. For example, two metallic pins 84 and 85 can be mounted on spring contacts 86, 87 insulated from each other, the pins 84, 85 making connection with the guide posts in the cassette when the cassette is inserted. A metallic film is provided on each end of the tape which will bridge the pillars 87, 88 and so complete an alarm circuit for a visual or audible alarm, or both.

In order to prevent the build-up of static electricity on the tape, the capstan 21 should be provided with a leakage path. This may be a wire contact as at 88 wrapped round the capstan 21, and connected to the anchor 67 by a spring 89.

I claim:

1. Apparatus for reproducing sound recorded on magnetic tape and comprising a tape deck; a capstan mounted on the tape deck for driving the tape; a pick-up transducer responsive to magnetic signals on the tape and mounted on the tape deck; a removable tape magazine comprising a body member having fiduciary surfaces locating the magazine on the tape deck, a pair of tape spools rotatably mounted on said body member, and guide means for presenting a length of the tape extending between the spools to the capstan and the pick-up transducer, said guide means being mounted from said body member and including a capstan idler roller for co-operating resiliently in a tape drive position with the capstan whereby to urge the tape against the capstan and hence to provide the tape drive; and an actuator member mounted on the tape deck for withdrawing said idler roller to a tape disengaged position in which pressure of the capstan on the idler roller is released.

2. Apparatus for reproducing sound according to claim 1 wherein said magazine includes a support member resiliently mounted from said body member and carrying said idler roller.

3. Apparatus for reproducing sound according to claim 2 wherein said actuator member co-operates with said support member to effect withdrawal of the idler roller.

4. Apparatus for reproducing sound according to claim 3, and further including means for simultaneously deenergizing the capstan and operating said actuator member.

5. Apparatus for reproducing sound according to claim 1 and including spool drive means drivably engaging at least one of said spools.

6. Apparatus for reproducing sound according to claim 5 wherein said spool drive means drivably engages a peripheral portion of said spool.

7. Apparatus for reproducing sound according to claim 5 wherein only one of said spools is engaged by said spool drive means, and including check means for braking rotation of the other spool of said pair.

8. Apparatus for reproducing sound according to claim 6 wherein said spool drive means is mounted to move with said actuator member, whereby to be disengaged from said spool on operation of said actuator member.

9. Apparatus for reproducing sound according to claim 8 wherein said spools and said guide means are so substantially symmetrically disposed with respect to said fiduciary surfaces that said magazine is reversible by overturning it.

10. Apparatus for reproducing sound according to claim 9 wherein said idler roller is disposed substantially midway between the spools.

11. Apparatus for reproducing sound according to claim 3 wherein said actuator member is mounted beside the capstan and said support member extends each side of the idler roller for engagement with said actuator member.

12. Apparatus for reproducing sound according to claim 1 wherein at least the periphery of said idler roller is formed from resilient material.

13. A magnetic tape magazine for use with a tape deck for reproducing recorded sound, said tape deck having a capstan for driving the tape along a tape path over a pick-up head, said magazine including:

a body member presenting spaced parallel fiduciary surfaces normal to the tape path for locating the magazine on the tape deck symmetrically relative to the capstan;

a length of tape carried by said body member in two coils; and guide means for guiding the tape along said tape path, said guide means including a single capstan idler roller centrally arranged between said fiduciary surfaces for cooperation in a tape drive position with the capstan and shiftable laterally of the tape path from said tape drive position, said guide means and said body member being symmetrical with respect to said fiduciary surfaces to permit reversal of the tape drive by overturning the magazine on the tape deck, whereby said single idler roller is automatically aligned with the capstan for either position of the magazine on the tape deck.

14. A magnetic tap magazine according to claim 13, and further including a pair of tape spools carrying the coils of tape, said body member exposing a peripheral portion of at least one of said spools for engagement by spool rim drive means.

15. Magnetic tape apparatus for reproducing recorded sound, comprising tape magazine means including a body member presenting spaced parallel fiduciary surfaces for locating the magazine on the tape deck, a length of magnetic tape on which said sound is recorded, said tape being carried in two coils on said body member, and guide means for guiding the tape along a given tape path normal to the fiduciary surfaces;

tape deck means having a pick-up head mounted beside said tape path for responding to the magnetic signals on said tape, a capstan, and drive means for rotating said capstan to drive the tape along said tape path;

said guide means including a single laterally shiftable capstan idler roller centrally arranged between said fiduciary surfaces and displaceable to a tape drive position relative to the capstan, said guide means, said capstan and said body member being symmetrical with respect to said fiduciary surfaces to permit reversal of the tape drive by overturning the magazine on the tape deck whereby said idler roller is automatically aligned with the capstan for either position of the magazine on the tape deck.

16. A magnetic tape magazine for use with a tape deck having a capstan for driving the tape along a tape path over a pick-up head, said magazine comprising a body member presenting fiduciary surfaces for locating the magazine on the tape deck;

a length of tape carried by said body member in two coils; and guide means for guiding the tape along said tape path, said guide means including a capstan idler roller, support means for rotatably supporting said idler roller, spring means mounted on said body for biasing said support means and said roller outwardly of the magazine toward a tape drive position with said capstan, said capstan idler roller in said tape drive position being symmetrical with respect to said fiduciary surfaces to permit reversal of the tape drive by overturning the magazine on the tape deck, and stop means for limiting movement of said support member outwardly of the magazine, said support means being adapted for lateral shifting relative to the tape path from said tape drive position by finger means on the tape deck.

17. Magnetic tape apparatus for reproducing recorded sound, comprising tape magazine means including a body member presenting fiduciary surfaces for locating the magazine on the tape deck, a length of magnetic tape on which said sound is recorded, said tape being carried in two coils on said body member, and guide means for guiding the tape along a given tape path, said guide means including a capstan idler roller displaceable to a tape drive position relative to the capstan, and a support member rotatably carrying said idler roller and extending on each side thereof; and tape deck means including a pick-up head mounted beside said tape path for responding to the magnetic signals on said tape, a capstan, drive means for rotating said capstan to drive the tape along said tape path, an actuator finger movably connected with said tape deck beside said capstan, said idler roller, said capstan and said body member being symmetrical relative to said fiduciary surfaces to permit reversal of the tape drive by overturning the magazine on the tape deck, said actuator finger being operable to engage said support member in either orientation of the magazine for withdrawing the idler roller from said tape drive position.

18. Magnetic tape apparatus for reproducing recorded sound, comprising tape magazine means including a body member presenting fiduciary surfaces for locating the magazine on the tape deck, a length of magnetic tape on which said sound is recorded, a pair of spools rotatably mounted in said body member and upon which the ends of the tape are coiled, and guide means for guiding the tape along a given tape path, said guide means including a laterally shiftable capstan idler roller;

and tape deck means including a pick-up head mounted beside said tape path for responding to the magnetic signals on said tape, a capstan, said idler roller being displaceable to a tape drive position relative to the capstan, drive means for rotating said capstan to drive the tape along the tape path, said guide means, said capstan and said body member being symmetrical with respect to said fiduciary surfaces to permit reversal of the tape drive by overturning the magazine on the tape deck, a movable arm supported on the tape deck, a spool drive wheel mounted on said arm, and drive means for rotating said spool drive wheel, said spool drive wheel being movable to a position in which it engages a rim portion of one of said spools, said body member exposing corresponding portions of each of said spools for engagement by said spool drive wheel in respective orientations of the magazine.

References Cited

UNITED STATES PATENTS

| | | | |
|---|---|---|---|
| 2,926,861 | 3/1960 | Murdoch | 242—55.13 |
| 3,001,025 | 9/1961 | Gaubert | 242—55.13 |
| 3,140,832 | 7/1964 | Cech | 242—55.13 |
| 3,217,997 | 11/1965 | Lundgren et al. | 242—55.19 |

LEONARD D. CHRISTIAN, *Primary Examiner.*